US010635645B1

(12) United States Patent
Abushwashi

(10) Patent No.: US 10,635,645 B1
(45) Date of Patent: Apr. 28, 2020

(54) SYSTEMS AND METHODS FOR MAINTAINING AGGREGATE TABLES IN DATABASES

(71) Applicant: Veritas Technologies LLC, Santa Clara, CA (US)

(72) Inventor: Aeham Abushwashi, Berkshire (GB)

(73) Assignee: Veritas Technologies LLC, Santa Clara, CA (US)

( * ) Notice: Subject to any disclaimer, the term of this patent is extended or adjusted under 35 U.S.C. 154(b) by 388 days.

(21) Appl. No.: 14/447,619

(22) Filed: Jul. 31, 2014

Related U.S. Application Data

(60) Provisional application No. 61/988,215, filed on May 4, 2014.

(51) Int. Cl.
*G06F 16/21* (2019.01)
*G06F 16/23* (2019.01)

(52) U.S. Cl.
CPC ........ *G06F 16/211* (2019.01); *G06F 16/2358* (2019.01)

(58) Field of Classification Search
None
See application file for complete search history.

(56) References Cited

U.S. PATENT DOCUMENTS

| 5,832,470 | A | | 11/1998 | Morita | |
| 5,850,547 | A | * | 12/1998 | Waddington | G06F 16/24556 718/102 |
| 5,946,692 | A | * | 8/1999 | Faloutsos | G06F 16/2462 |
| 5,991,754 | A | * | 11/1999 | Raitto | G06F 16/24539 |
| 6,009,432 | A | | 12/1999 | Tarin | |
| 6,205,451 | B1 | * | 3/2001 | Norcott | G06F 16/24539 |
| 6,216,134 | B1 | * | 4/2001 | Heckerman | G06Q 30/0643 707/749 |

(Continued)

FOREIGN PATENT DOCUMENTS

| AU | 2002334721 B2 | 10/2008 |
| AU | 2015256400 B2 | 12/2017 |

(Continued)

OTHER PUBLICATIONS

Tim Haynes; Systems and Methods for Navigating Through a Hierarchy of Nodes Stored in a Database; U.S. Appl. No. 14/480,558, filed Sep. 8, 2014.

(Continued)

*Primary Examiner* — Jeff A Burke
*Assistant Examiner* — Edward Jacobs
(74) *Attorney, Agent, or Firm* — FisherBroyles, LLP

(57) ABSTRACT

The disclosed computer-implemented method for maintaining aggregate tables in databases may include (1) maintaining a database that comprises a primary table of data, an intermediate mapping table of metadata from the data in the primary table, and an aggregate table, (2) for each new item of data received during a time period, updating the primary table with the new item of data and updating at least one row in the intermediate mapping table with metadata from the new item of data, and (3) at the end of the time period, updating the aggregate table with an aggregation of the metadata based on the metadata stored in the intermediate table. Various other methods, systems, and computer-readable media are also disclosed.

20 Claims, 7 Drawing Sheets

(56) References Cited

U.S. PATENT DOCUMENTS

| | | | |
|---|---|---|---|
| 6,334,128 B1* | 12/2001 | Norcott | G06F 16/2393 |
| 6,345,272 B1* | 2/2002 | Witkowski | G06F 16/24539 |
| | | | 707/759 |
| 6,356,902 B1 | 3/2002 | Tan | |
| 6,446,061 B1 | 9/2002 | Doerre et al. | |
| 6,477,525 B1* | 11/2002 | Bello | G06F 16/24539 |
| 6,484,159 B1* | 11/2002 | Mumick | G06F 16/2455 |
| 6,496,819 B1* | 12/2002 | Bello | G06F 16/24537 |
| 6,594,653 B2* | 7/2003 | Colby | G06F 16/24539 |
| 6,606,626 B1 | 8/2003 | Ponnekanti | |
| 6,658,413 B1* | 12/2003 | Reddy | G06F 17/30362 |
| 6,763,352 B2* | 7/2004 | Cochrane | G06F 16/24539 |
| 6,882,993 B1* | 4/2005 | Lawande | G06F 16/2393 |
| | | | 707/714 |
| 6,915,289 B1* | 7/2005 | Malloy | G06F 16/2264 |
| 6,922,696 B1 | 7/2005 | Lincoln | |
| 7,100,195 B1 | 8/2006 | Underwood | |
| 7,158,994 B1* | 1/2007 | Smith | G06F 16/24539 |
| | | | 707/717 |
| 7,392,248 B2* | 6/2008 | Bakalash | C03B 37/02718 |
| 7,428,220 B1* | 9/2008 | Caronni | H04L 45/48 |
| | | | 370/254 |
| 7,516,412 B1 | 4/2009 | De Waal | |
| 7,610,285 B1 | 10/2009 | Zoellner | |
| 8,364,720 B2 | 1/2013 | Levy | |
| 8,417,715 B1 | 4/2013 | Bruckhaus | |
| 8,458,186 B2 | 6/2013 | Stringham et al. | |
| 8,478,742 B2* | 7/2013 | Folkert | G06F 16/24539 |
| | | | 707/718 |
| 8,494,894 B2 | 7/2013 | Jaster | |
| 8,533,176 B2 | 9/2013 | Pandey | |
| 8,589,447 B1 | 11/2013 | Grunwald | |
| 8,682,886 B2 | 3/2014 | Sorkin et al. | |
| 8,737,683 B2* | 5/2014 | Kirmse | G06T 1/0085 |
| | | | 382/100 |
| 8,755,837 B2 | 6/2014 | Rhoads | |
| 8,918,388 B1* | 12/2014 | Chen | G06F 16/283 |
| | | | 707/714 |
| 9,268,849 B2 | 2/2016 | Siedlecki | |
| 9,311,326 B2 | 4/2016 | Goyen | |
| 9,578,171 B2 | 2/2017 | Barinov | |
| 10,025,804 B2 | 7/2018 | Vranyes et al. | |
| 10,073,864 B1 | 9/2018 | Koeten et al. | |
| 10,078,668 B1 | 9/2018 | Woodrow et al. | |
| 10,095,768 B2 | 10/2018 | Koeten | |
| 2001/0037324 A1 | 11/2001 | Agrawal et al. | |
| 2001/0039544 A1 | 11/2001 | Chakrabarti et al. | |
| 2002/0010708 A1 | 1/2002 | McIntosh | |
| 2002/0055942 A1 | 5/2002 | Reynolds | |
| 2002/0069102 A1* | 6/2002 | Vellante | G06Q 99/00 |
| | | | 705/7.22 |
| 2003/0028509 A1* | 2/2003 | Sah | G06F 16/284 |
| 2003/0145277 A1 | 7/2003 | Neal et al. | |
| 2003/0200221 A1* | 10/2003 | Bakalash | C03B 37/02718 |
| 2004/0010493 A1 | 1/2004 | Kojima | |
| 2004/0128289 A1* | 7/2004 | Cochrane | G06F 16/2393 |
| 2004/0215626 A1* | 10/2004 | Colossi | G06F 16/24542 |
| 2005/0038805 A1 | 2/2005 | Maren | |
| 2005/0102195 A1 | 5/2005 | Kuehr-McLaren | |
| 2005/0235004 A1* | 10/2005 | Folkert | G06F 16/24539 |
| 2006/0106782 A1 | 5/2006 | Blumenau | |
| 2006/0122964 A1* | 6/2006 | Yu | G06F 16/2393 |
| 2006/0265427 A1 | 11/2006 | Cohen | |
| 2007/0112783 A1 | 5/2007 | McCreight | |
| 2007/0244892 A1* | 10/2007 | Narancic | G06F 16/258 |
| 2008/0071908 A1 | 3/2008 | Nair et al. | |
| 2008/0077852 A1 | 3/2008 | Fleishman | |
| 2008/0091641 A1* | 4/2008 | Barua | G06F 16/248 |
| 2008/0235077 A1 | 9/2008 | Harkness et al. | |
| 2008/0306947 A1 | 12/2008 | Kolesnikov | |
| 2009/0019005 A1* | 1/2009 | Hu | G06F 16/24539 |
| 2009/0024561 A1 | 1/2009 | Palanisamy | |
| 2009/0043825 A1 | 2/2009 | Bourne | |
| 2009/0049040 A1 | 2/2009 | Fay et al. | |
| 2009/0063419 A1 | 3/2009 | Nurminen | |
| 2009/0064160 A1* | 3/2009 | Larson | G06F 16/2272 |
| | | | 718/104 |
| 2009/0125828 A1* | 5/2009 | Fried | G06F 16/288 |
| | | | 715/769 |
| 2009/0182779 A1* | 7/2009 | Johnson | G06F 16/2393 |
| 2009/0276393 A1* | 11/2009 | Bestgen | G06F 16/2453 |
| 2010/0017363 A1* | 1/2010 | Bellamkonda | G06F 16/24542 |
| | | | 707/E17.014 |
| 2010/0042615 A1 | 2/2010 | Rinearson | |
| 2010/0088317 A1* | 4/2010 | Bone | G06F 16/1734 |
| | | | 707/737 |
| 2010/0146004 A1* | 6/2010 | Sim-Tang | G06F 11/1448 |
| | | | 707/797 |
| 2010/0274750 A1* | 10/2010 | Oltean | G06F 16/122 |
| | | | 706/47 |
| 2010/0333116 A1 | 12/2010 | Prahlad | |
| 2011/0040773 A1* | 2/2011 | Danesi | G06F 16/24556 |
| | | | 707/756 |
| 2011/0113466 A1 | 5/2011 | Stringham et al. | |
| 2011/0131628 A1 | 6/2011 | Pfitzmann | |
| 2011/0145217 A1 | 6/2011 | Maunder | |
| 2011/0225125 A1 | 9/2011 | Colgrave | |
| 2011/0227754 A1* | 9/2011 | Hill | G06Q 50/06 |
| | | | 340/870.01 |
| 2011/0276607 A1* | 11/2011 | Surna | G06F 9/30192 |
| | | | 707/812 |
| 2011/0320480 A1 | 12/2011 | Kisin | |
| 2012/0047483 A1 | 2/2012 | Amit | |
| 2012/0198073 A1 | 8/2012 | Srikanth | |
| 2013/0013650 A1 | 1/2013 | Shum | |
| 2013/0054731 A1 | 2/2013 | Branton | |
| 2013/0166543 A1 | 6/2013 | MacDonald | |
| 2013/0204886 A1 | 8/2013 | Faith et al. | |
| 2013/0311509 A1* | 11/2013 | Sorkin | G06F 16/2228 |
| | | | 707/769 |
| 2013/0332487 A1* | 12/2013 | Ramesh | G06F 16/2455 |
| | | | 707/775 |
| 2014/0006244 A1 | 1/2014 | Crowley et al. | |
| 2014/0032617 A1* | 1/2014 | Stanfill | G06F 16/25 |
| | | | 707/809 |
| 2014/0052689 A1 | 2/2014 | Ficara et al. | |
| 2014/0068706 A1 | 3/2014 | Aissi | |
| 2014/0081890 A1 | 3/2014 | Casiano | |
| 2014/0089246 A1 | 3/2014 | Adriaansen | |
| 2014/0098101 A1* | 4/2014 | Friedlander | G06F 16/28 |
| | | | 345/440 |
| 2014/0101124 A1 | 4/2014 | Scriffignano | |
| 2014/0114916 A1* | 4/2014 | Szabo | G06F 16/256 |
| | | | 707/616 |
| 2014/0122439 A1* | 5/2014 | Faerber | G06F 16/215 |
| | | | 707/683 |
| 2014/0143294 A1* | 5/2014 | Vitaly | G06F 9/00 |
| | | | 709/201 |
| 2014/0244662 A1 | 8/2014 | Mo | |
| 2014/0294169 A1* | 10/2014 | Barinov | H04M 3/5175 |
| | | | 379/265.03 |
| 2015/0088812 A1* | 3/2015 | Ziauddin | G06F 16/21 |
| | | | 707/609 |
| 2015/0095430 A1* | 4/2015 | Kaushik | G06F 16/20 |
| | | | 709/206 |
| 2015/0193477 A1* | 7/2015 | Dumant | G06F 16/211 |
| | | | 707/609 |
| 2015/0286697 A1 | 10/2015 | Byrne | |
| 2015/0302205 A1* | 10/2015 | Milman | G06F 21/60 |
| | | | 726/26 |
| 2015/0304169 A1 | 10/2015 | Milman | |
| 2015/0317339 A1 | 11/2015 | Vranyes et al. | |
| 2015/0347773 A1 | 12/2015 | Bonney et al. | |
| 2016/0306897 A1 | 10/2016 | Huang et al. | |

FOREIGN PATENT DOCUMENTS

| | | |
|---|---|---|
| AU | 2015346655 B2 | 1/2019 |
| CA | 2 955 257 A1 | 11/2015 |
| CN | 101616090 A | 12/2009 |
| CN | 107209765 A | 9/2017 |

(56) References Cited

FOREIGN PATENT DOCUMENTS

| | | |
|---|---|---|
| EP | 3 140 787 A1 | 3/2017 |
| EP | 3 218 824 A1 | 9/2017 |
| JP | H11-213014 A | 8/1999 |
| JP | 2004007508 A | 1/2004 |
| JP | 2005018754 A | 1/2005 |
| JP | 2008158993 A | 7/2008 |
| JP | 2012504280 A | 2/2012 |
| JP | 6336675 B2 | 6/2018 |
| WO | 03/030032 A2 | 4/2003 |
| WO | WO 2015/055502 A2 | 4/2015 |
| WO | 2015/171434 A1 | 11/2015 |
| WO | 2016/077230 A1 | 5/2016 |

OTHER PUBLICATIONS

Tim Haynes, et al; Systems and Methods for Organizing Multi-Faceted Sets of Data; U.S. Appl. No. 14/480,560, filed Sep. 8, 2014.
"SQL", http://en.wikipedia.org/wiki/SQL, as accessed May 1, 2014, Wikipedia, (Jan. 1, 2004).
"Relational database management system", http://en.wikipedia.org/wiki/Relational_database_management_system, as accessed May 1, 2014, Wikipedia, (Dec. 18, 2003).
"The four categories of NoSQL databases", http://rebelic.nl/2011/05/28/the-four-categories-of-nosql-databases/, as accessed May 1, 2014, (Aug. 2, 2013).
Ynn-Pyng Anker Tsaur; Systems and Methods for Securely Storing Backup Data While Facilitating Fast Failovers; U.S. Appl. No. 13/656,536, filed Oct. 19, 2012.
Carey Nachenberg; Systems and Methods for Detecting Malicious Files; U.S. Appl. No. 13/715,265, filed Dec. 14, 2012.
Sudhakar Paulzagade, et al; Systems and Methods for Modifying Track Logs During Restore Processes; U.S. Appl. No. 14/283,742, filed May 21, 2014.
Lagoze, Carl et al., "Metadata aggregation and "automated digital libraries": A retrospective on the NSDL experience", http://arxiv.org/ftp/cs/papers/0601/0601125.pdf, as accessed May 1, 2014, (2006).
Steve A. Vranyes, et al; Systems and Methods for Aggregating Information-Asset Metadata from Multiple Disparate Data-Management Systems; U.S. Appl. No. 14/483,133, filed Sep. 10, 2014.
Karl Woodrow, et al; Systems and Methods for Utilizing Information-Asset Metadata Aggregated from Multiple Disparate Data-Management Systems; U.S. Appl. No. 14/483,136, filed Sep. 10, 2014.
"IF4IT, The International Foundation for Information Technology", http://www.if4it.com/SYNTHESIZED/DISCIPLINES/Information_Asset_Management_Home_Page.html, as accessed May 1, 2014, (2009).
Soares, Sunil "Big Data Governance", http://dama-ny.com/images/meeting/101713/Presentation_deck/damanyc_bigdatagovernance17_october_2013.pdf, as accessed May 1, 2014, Information Asset, LLC, (Oct. 17, 2013).
"IAPMS (Information Asset Portfolio Management System)", http://www.iapms-home.com/, as accessed May 1, 2014, (2012).
"Streamline E-Discovery Collections Management Process", http://falcondiscovery.com/resources/case-studies/streamline-ediscovery-collections-management-process-2/, as accessed May 1, 2014, Falcon Discovery, (Oct. 6, 2011).
"ediscovery.com", http://www.ediscovery.com/eu/solutions/collect/, as accessed May 1, 2014, Kroll Ontrack Inc., (2014).
"Corporations Optimize Cost-effective E-discovery", http://www.hds.com/assets/pdf/hitachi-corporations-optimize-cost-effective-e-discovery.pdf, as accessed May 1, 2014, Solution Profile, Hitachi Data Systems Corporation, (Jan. 2012).
"Optimizing Resources for Efficient eDiscovery", http://www.novitex.com/pdfs/white-papers/White-Paper_Legal_Efficient%20eDiscovery_PBMS00101.pdf, as accessed May 1, 2014, White Paper, Pitney Bowes Inc., (2012).

"HP Autonomy", http://www.autonomy.com/, as accessed May 1, 2014, Hewlett-Packard, (Oct. 29, 1996).
"CommVault® Simpana Software", http://www.commvault.com/simpana-software, as accessed May 1, 2014, (Jul. 5, 2012).
"Proofpoint", http://www.proofpoint.com/, as accessed May 1, 2014, (Nov. 28, 2001).
"Nuix", http://www.nuix.com/, as accessed May 1, 2014, (Jan. 7, 2007).
"Varonis", http://www.varonis.com/, as accessed May 1, 2014, (Aug. 31, 2004).
"InfoSphere Platform", http://www-01.ibm.com/software/data/infosphere/, as accessed May 1, 2014, IBM, (Jan. 8, 2009).
"Acaveo", http://www.acaveo.com/, as accessed May 1, 2014, (Feb. 2, 2011).
"ZyLAB", http://www.zylab.com/, as accessed May 1, 2014, (Dec. 29, 1996).
"Imperva", http://www.imperva.com/, as accessed May 1, 2014, (Feb. 16, 2004).
"NTP Software", http://www.ntpsoftware.com/, as accessed May 1, 2014, (Dec. 20, 1996).
"APTARE", http://www.aptare.com/, as accessed May 1, 2014, (1993).
"TITUS", http://www.titus.com/, as accessed May 1, 2014, (Dec. 7, 1998).
"Index Engines", http://www.indexengines.com/, as accessed May 1, 2014, (Mar. 20, 2004).
"Duplicate Image Finder", http://www.alldup.de/delete_duplicate_files/duplicate_image_finder.htm, as accessed May 1, 2014, AllDup, Michael Thummerer Software Design, (2000).
V.Laurie, "Best Free Duplicate File Remover", http://www.techsupportalert.com/best-free-duplicate-file-remover.htm, as accessed May 1, 2014, (Jul. 4, 2014).
"CloneSpy", http://www.clonespy.com/, as accessed May 1, 2014, (Aug. 5, 2001).
"Symantec Data Insight", http://www.symantec.com/data-insight, as accessed May 1, 2014, Symantec Corporation, (1995).
Alok Dwivedi, et al; Systems and Methods for Automatically Translating Data Records; U.S. Appl. No. 14/540,171, filed Nov. 13, 2014.
Robert Koeten; Systems and Methods for Aggregating Information-Asset Classifications; U.S. Appl. No. 14/542,165, filed Nov. 14, 2014.
"BigQuery in Practice: Loading Data Sets That are Terabytes and Beyond", https://cloud.google.com/developers/articles/bigquery-in-practice/, as accessed May 1, 2014, (Feb. 27, 2014).
Stockinger, Kurt et al., "Query-Driven Visualization of Large Data Sets", http://www.researchgate.net/publication/200084949_Query-Driven_Visualization_of_Large_Data_Sets, as accessed May 1, 2014, Visualization, 2005, VIS 05, IEEE, (2005).
"Apache Spark—a Fast Big Data Analytics Engine", https://bighadoop.wordpress.com/2014/04/03/apache-spark-a-fast-big-data-analytics-engine/, as accessed May 1, 2014, (Apr. 3, 2014).
Robert Koeten, et al; Systems and Methods for Automated Aggregation of Information-Source Metadata; U.S. Appl. No. 14/561,244, filed Dec. 5, 2014.
"Improving Database Query Performance", http://kb.tableausoftware.com/articles/knowledgebase/database-query-performance, as accessed May 1, 2014, (Dec. 19, 2011).
"Collaborative filtering", http://en.wikipedia.org/wiki/Collaborative_filtering, as accessed May 1, 2014, Wikipedia, (Apr. 27, 2004).
Keyser, Chris "Optimizing for Star Schemas on Amazon Redshift", http://aws.amazon.com/articles/8341516668711341, as accessed May 1, 2014, Amazon Web Services, Inc., (Dec. 31, 2013).
U.S. Appl. No. 61/805,513, filed Mar. 26, 2013, Barinov.
Apache Spark, a Fast Big Data Analytics Engine; https://bighadoop.wordpress.com/2014/04/03/apache-spark-a-fast-big-data-analytics-engine/, as accessed May 1, 2014.
CommVault Simpana Software; http://www.commvault.com/simpana-software, as accessed May 1, 2014.
Dourish, Paul, et al., "Extending Document Management Systems with User-Specific Active Properties", ACM Transactions on Information Systems, vol. 18, No. 2, Apr. 2000, pp. 140-170.

(56) References Cited

OTHER PUBLICATIONS

Microsoft Computer Dictionary, 5th Edition, Microsoft Press, Redmond, WA, 2002, pp. 67-68.
Random House Webster's College Dictionary, Random House, New York, NY, Apr. 2000, pp. 25 and 1429.
Michael Main et al., Data Structures & Other Objects Using C++, 2nd Edition, Addison Wesley, Boston, MA, 2001, pp. 91-92.
Millen, Jonathan K., et al., "Security for Object-Oriented Database Systems", RISP 1992, Oakland, CA, Aug. 6, 1992, pp. 260-272.
Wikipedia, "Fingerprint (computing)", URL: https://en.wikipedia.org/w/index.php?title=Fingerprint_(computing)&oldid=571160717, Sep. 2, 2013, pp. 1-4.
Barinov, Vitaly Y., "Low Latency Distributed Aggregation for Contact Center Agent-Groups on Sliding Interval", U.S. Appl. No. 61/805,513, filed Mar. 26, 2013, 84 pages.
International Search Report and Written Opinion received for PCT Application Serial No. PCT/US2015/028669 dated Jul. 22, 2015, 11 pages.
International Preliminary Report on Patentability received for PCT Application Serial No. PCT/US2015/028669 dated Nov. 17, 2016, 9 pages.
International Search Report and Written Opinion received for PCT Application Serial No. PCT/US2015/059744 dated Feb. 5, 2016, 12 pages.
International Preliminary Report on Patentability received for PCT Application Serial No. PCT/US2015/059744 dated May 26, 2017, 11 pages.

\* cited by examiner

SYSTEMS AND METHODS FOR MAINTAINING AGGREGATE TABLES IN DATABASES

CROSS REFERENCE TO RELATED APPLICATION

This application claims the benefit of U.S. Provisional Application No. 61/988,215, filed 4 May 2014, the disclosure of which is incorporated, in its entirety, by this reference.

BACKGROUND

Large data sets are being used increasingly for everything from predicting consumer behavior to managing traffic conditions on the roadways. Continuing improvements in storage technology mean that many of the previous barriers to managing large data sets are disappearing, allowing even relatively small organizations to store and process large databases. More and more, metadata gleaned from analysis of data is also being generated, used, and stored. But data is only as useful as the ability to retrieve that data. Analyzing and retrieving data and metadata at a reasonable speed is important not just for governments and large research organizations but also for enterprises and even some individual users.

Traditional systems for analyzing and retrieving data may aggregate the data to be analyzed at the time of the query. This aggregation may take a substantial amount of time and reduce the number of searches that may be run in a reasonable time frame. Some traditional systems may attempt to solve this problem by maintaining a table of commonly referenced metadata. However, such mechanisms that track metadata may become unsynced from their source tables due to an accumulation of minor flaws during the update process. Accordingly, the instant disclosure identifies an addresses a need for systems and methods for maintaining aggregate tables in databases.

SUMMARY

As will be described in greater detail below, the instant disclosure describes various systems and methods for maintaining aggregate tables in databases by periodically regenerating the aggregate tables based on intermediate mapping tables that store metadata from primary tables.

In one example, a computer-implemented method for maintaining aggregate tables in databases may include (1) maintaining a database that may include a primary table of data, an intermediate mapping table of metadata from the data in the primary table, and an aggregate table, (2) for each new item of data received during a time period, updating the primary table with the new item of data and updating at least one row in the intermediate mapping table with metadata from the new item of data, and (3) at the end of the time period, updating the aggregate table with an aggregation of the metadata based on the metadata stored in the intermediate table.

The aggregate table may be updated in a number of ways. In some examples, updating the aggregate table with the aggregation may include updating a count in the aggregate table to reflect the metadata. In one embodiment, the time period is one of a set of predefined time periods and at the end of each predefined time period within the set of predefined time periods the aggregate table is regenerated based on metadata added to the intermediate mapping table that describes data added to the primary table during the predefined time period. In some examples, updating the aggregate table based on the metadata stored in the intermediate table may include regenerating the aggregate table entirely based on the intermediate table.

In some examples, maintaining the database may include creating the intermediate mapping table based on the primary table. In these examples, the intermediate mapping table may be created when the database is initially configured.

In some examples, the computer-implemented method may further include retrieving the aggregation of the metadata from the aggregate table. In one embodiment, the computer-implemented method may further include retrieving at least one data mapping from the intermediate mapping table based on a search result obtained by retrieving the aggregation of the metadata from the aggregate table and retrieving at least one item of data from the primary table based on the data mapping retrieved from the intermediate mapping table.

In some embodiments, updating the row in the intermediate mapping table may include identifying the row to be updated based on a unique combination of properties that is shared by other data to which pointers are stored in the row in the intermediate mapping table. Additionally or alternatively, updating the row in the intermediate mapping table may include storing a pointer to the new item of data in the intermediate mapping table. In some examples, the computer-implemented method may further include retrieving a set of data from the intermediate mapping table that may include a set of pointers to items of data and a set of metadata about the items of data.

In one embodiment, a system for implementing the above-described method may include (1) a maintaining module, stored in memory, that maintains a database that may include a primary table of data, an intermediate mapping table of metadata from the data in the primary table, and an aggregate table, (2) a mapping module, stored in memory, that, for each new item of data received during a time period, updates the primary table with the new item of data and updates at least one row in the intermediate mapping table with metadata from the new item of data, (3) an aggregation module, stored in memory, that at the end of the time period, updates the aggregate table with an aggregation of the metadata based on the metadata stored in the intermediate table, and (4) at least one physical processor configured to execute the maintaining module, the mapping module, and the aggregation module.

In some examples, the above-described method may be encoded as computer-readable instructions on a non-transitory computer-readable medium. For example, a computer-readable medium may include one or more computer-executable instructions that, when executed by at least one processor of a computing device, may cause the computing device to (1) maintain a database that may include a primary table of data, an intermediate mapping table of metadata from the data in the primary table, and an aggregate table, (2) for each new item of data received during a time period, update the primary table with the new item of data and update at least one row in the intermediate mapping table with metadata from the new item of data, and (3) at the end of the time period, update the aggregate table with an aggregation of the metadata based on the metadata stored in the intermediate table.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

Figure 1:
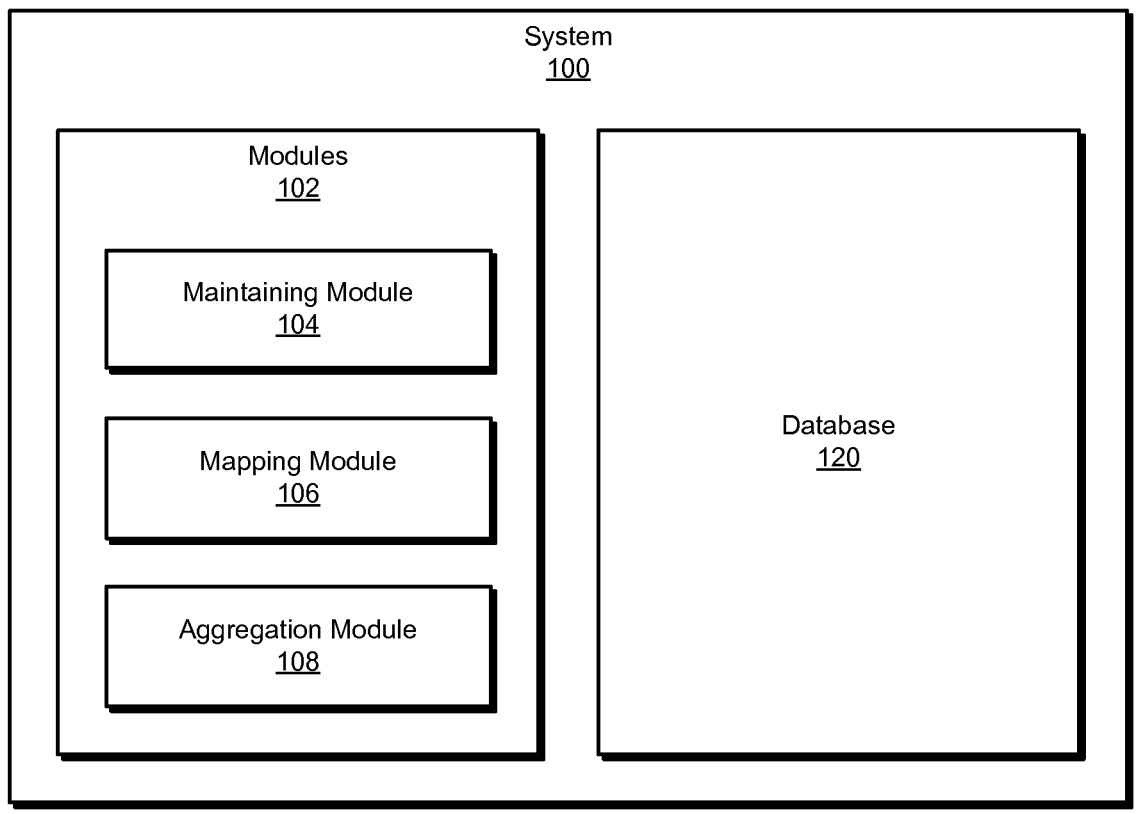
FIG. 1 is a block diagram of an exemplary system for maintaining aggregate tables in databases.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION OF EXEMPLARY EMBODIMENTS

The present disclosure is generally directed to systems and methods for maintaining aggregate tables in databases. As will be explained in greater detail below, by periodically regenerating an aggregate table based on an intermediate mapping table, the systems described herein may maintain an accurate aggregate table that may be more quickly searchable for aggregations of metadata than a large primary table. Because the counts, totals, and/or other aggregations in the aggregate table are regenerated based on the intermediate table, the aggregate table may not accumulate errors that may be caused by systems that simply increment counts and/or totals. The presence of an accurate aggregate table means that the primary table may not have to be queried in order to retrieve aggregations of metadata, which may lead to a significant time savings if the primary table is very large.

Figure 2:
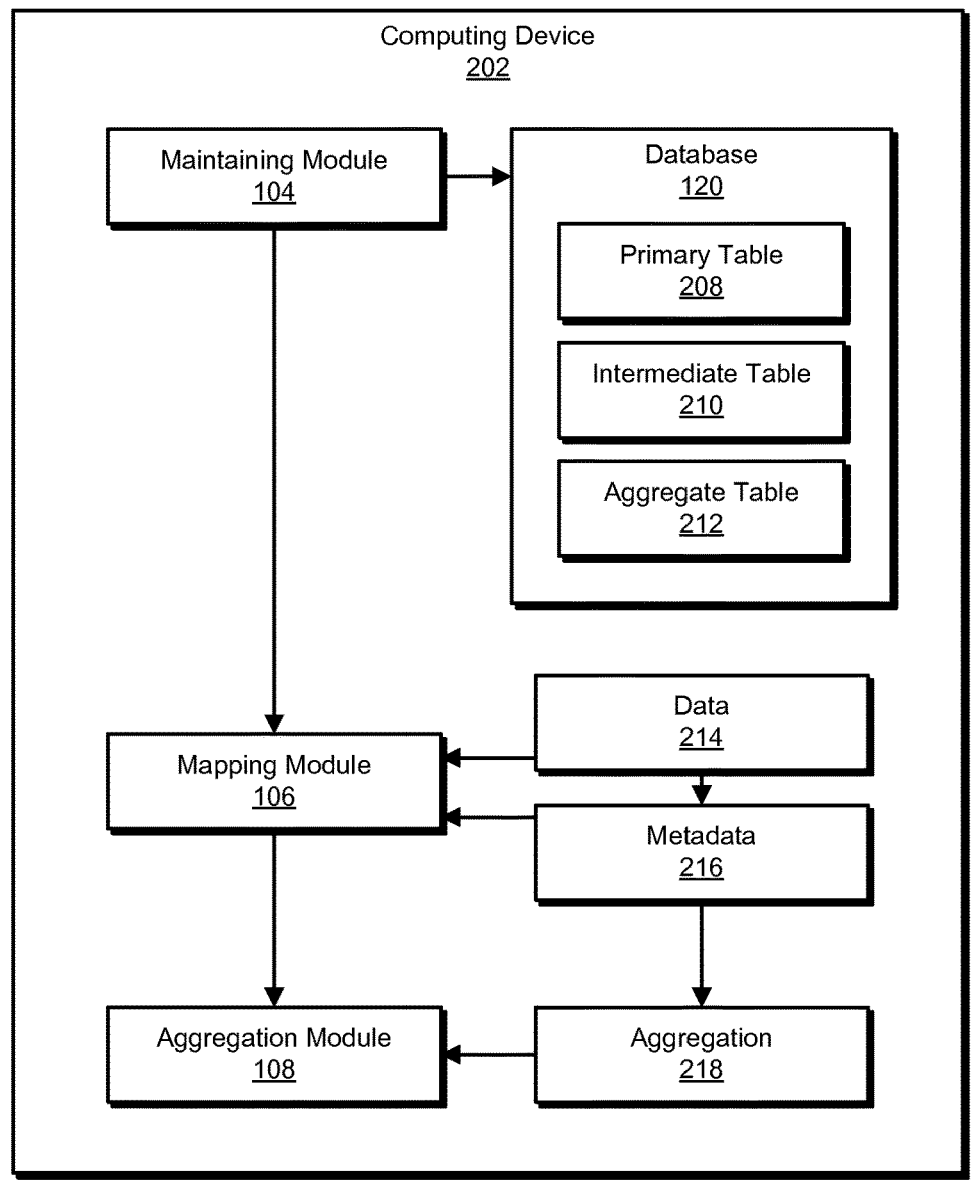
FIG. 2 is a block diagram of an additional exemplary system for maintaining aggregate tables in databases.
Figure 3:
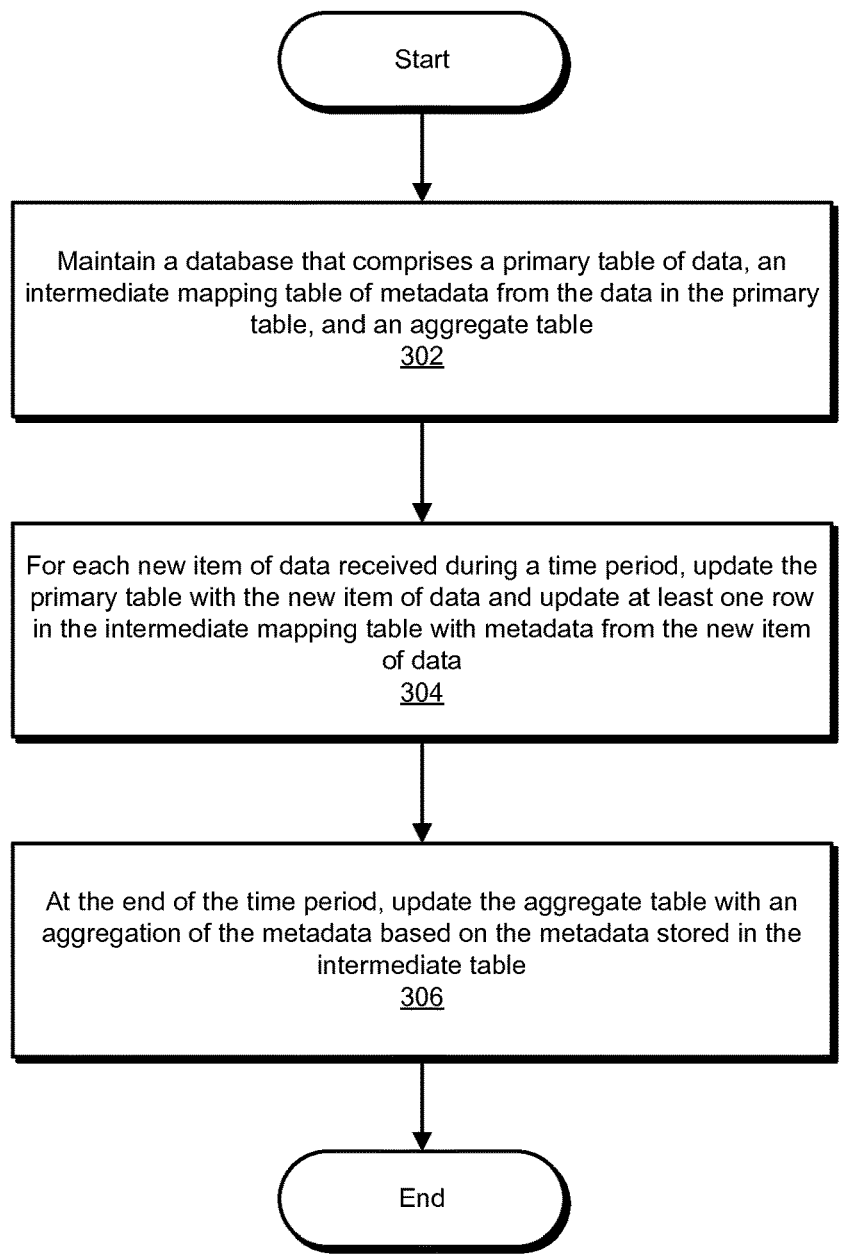
FIG. 3 is a flow diagram of an exemplary method for maintaining aggregate tables in databases.
Figure 4:
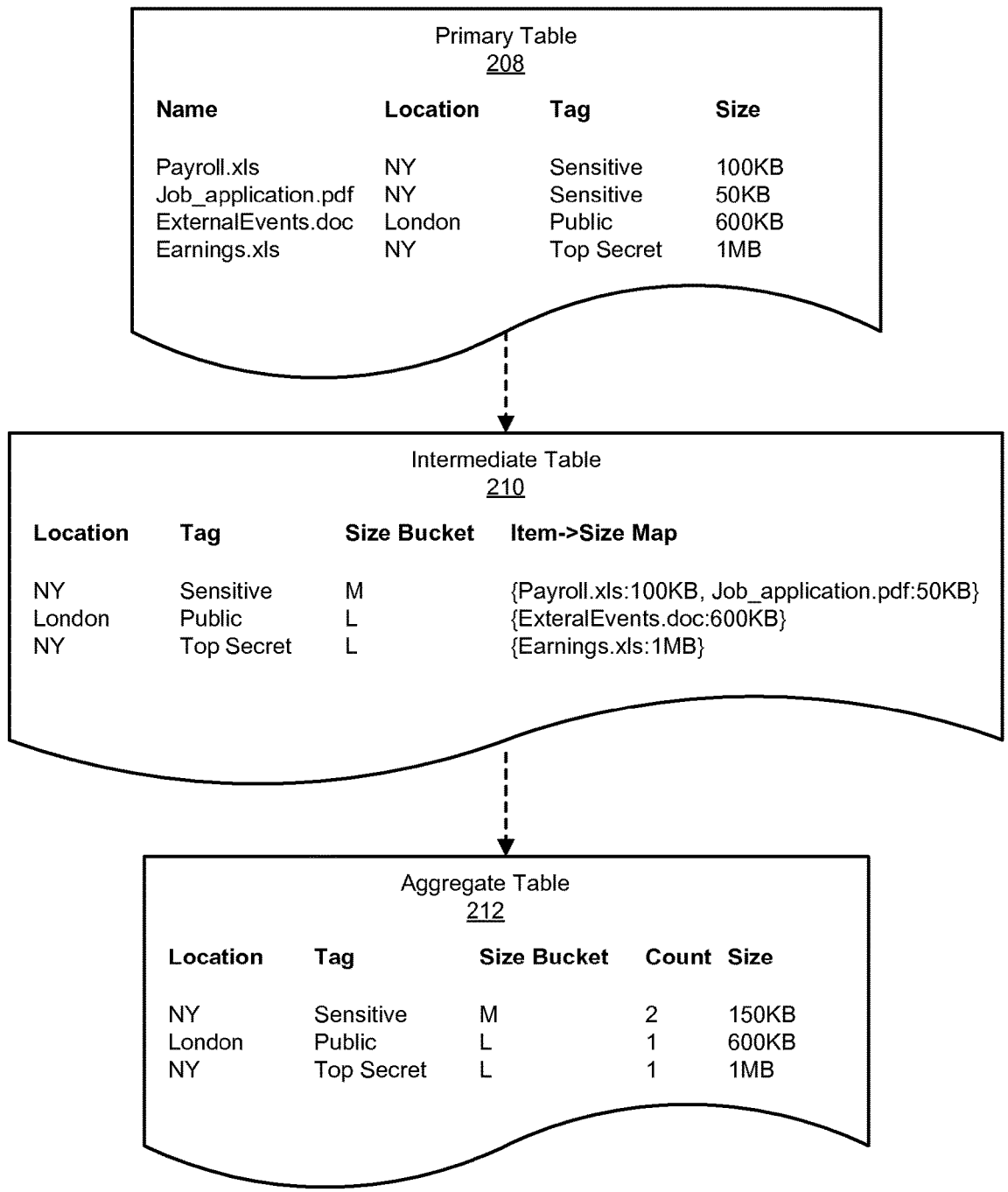
FIG. 4 is a block diagram of an exemplary computing system for maintaining aggregate tables in databases.

The following will provide, with reference to FIGS. 1, 2, and 4, detailed descriptions of exemplary systems for maintaining aggregate tables in databases. Detailed descriptions of corresponding computer-implemented methods will also be provided in connection with FIGS. 3 and 5. In addition, detailed descriptions of an exemplary computing system and network architecture capable of implementing one or more of the embodiments described herein will be provided in connection with FIGS. 6 and 7, respectively.

FIG. 1 is a block diagram of exemplary system 100 for maintaining aggregate tables in databases. As illustrated in this figure, exemplary system 100 may include one or more modules 102 for performing one or more tasks. For example, and as will be explained in greater detail below, exemplary system 100 may include a maintaining module 104 that may maintain a database that may include a primary table of data, an intermediate mapping table of metadata from the data in the primary table, and an aggregate table. Exemplary system 100 may additionally include a mapping module 106 that may, for each new item of data received during a time period, update the primary table with the new item of data and update at least one row in the intermediate mapping table with metadata from the new item of data. Exemplary system 100 may also include an aggregation module 108 that may, at the end of the time period, update the aggregate table with an aggregation of the metadata based on the metadata stored in the intermediate table. Although illustrated as separate elements, one or more of modules 102 in FIG. 1 may represent portions of a single module or application.

In certain embodiments, one or more of modules 102 in FIG. 1 may represent one or more software applications or programs that, when executed by a computing device, may cause the computing device to perform one or more tasks. For example, and as will be described in greater detail below, one or more of modules 102 may represent software modules stored and configured to run on one or more computing devices, such as computing device 202 in FIG. 2, computing system 610 in FIG. 6, and/or portions of exemplary network architecture 700 in FIG. 7. One or more of modules 102 in FIG. 1 may also represent all or portions of one or more special-purpose computers configured to perform one or more tasks.

As illustrated in FIG. 1, exemplary system 100 may also include one or more databases, such as database 120. In one example, database 120 may be configured to store aggregations of metadata.

Database 120 may represent portions of a single database or computing device or a plurality of databases or computing devices. For example, database 120 may represent a portion of computing system 610 in FIG. 6 and/or portions of exemplary network architecture 700 in FIG. 7. Alternatively, database 120 in FIG. 1 may represent one or more physically separate devices capable of being accessed by a computing device, such as computing system 610 in FIG. 6 and/or portions of exemplary network architecture 700 in FIG. 7. In some examples, database 120 may represent a noSQL database such as CASSANDRA, HADOOP, MONGODB, and/or any other suitable type or form of noSQL database. As used herein, the term "noSQL database" generally refers to a database that models data in structures other than tabular relations. NoSQL databases may include databases that provide wide column stores, document stores, key value stores, graphical relationships, object relationships, tabular relationships, and/or various other storage technologies.

Exemplary system 100 in FIG. 1 may be implemented in a variety of ways. For example, all or a portion of exemplary system 100 may represent portions of exemplary system 200 in FIG. 2. As shown in FIG. 2, system 200 may include a computing device 202. In one example, computing device 202 may be programmed with one or more of modules 102 and/or may store all or a portion of the data in database 120.

In one embodiment, one or more of modules 102 from FIG. 1 may, when executed by at least one processor of computing device 202, enable computing device 202 to maintain aggregate tables in a database. For example, and as will be described in greater detail below, maintaining module 104 may maintain database 120 that may include a primary table 208 of data, an intermediate table 210 of metadata from the data in primary table 208, and an aggregate table 212. Mapping module 106 may, for each item of data 214 received during a time period, update primary table 208 with data 214 and update at least one row in intermediate table 210 with metadata 216 from data 214. Next, aggregation module 108 may, at the end of the time period, update aggregate table 212 with an aggregation 218 of metadata 216 based on metadata 216 stored in intermediate table 210.

Computing device 202 generally represents any type or form of computing device capable of reading computer-executable instructions. Examples of computing device 202 include, without limitation, laptops, tablets, desktops, servers, cellular phones, Personal Digital Assistants (PDAs), multimedia players, embedded systems, wearable devices (e.g., smart watches, smart glasses, etc.), gaming consoles, combinations of one or more of the same, exemplary computing system 610 in FIG. 6, or any other suitable computing device.

FIG. 3 is a flow diagram of an exemplary computer-implemented method 300 for maintaining aggregate tables in databases. The steps shown in FIG. 3 may be performed by any suitable computer-executable code and/or computing system. In some embodiments, the steps shown in FIG. 3 may be performed by one or more of the components of system 100 in FIG. 1, system 200 in FIG. 2, computing system 610 in FIG. 6, and/or portions of exemplary network architecture 700 in FIG. 7.

As illustrated in FIG. 3, at step 302 one or more of the systems described herein may maintain a database that may include a primary table of data, an intermediate mapping table of metadata from the data in the primary table, and an aggregate table. For example, maintaining module 104 may, as part of computing device 202 in FIG. 2, maintain database 120 that may include primary table 208 of data, intermediate table 210 of metadata from the data in primary table 208, and aggregate table 212.

The term "primary table," as used herein, generally refers to any data structure in a database. A primary table may include a table, a hash, an array, a linked list, and/or any other relevant data structure. A primary table may store data of any type including text, images, numbers, pointers, files, and/or folders. In some embodiments, a primary table may store files and/or accompanying metadata. For example, a primary table may store document files and/or metadata that describes the size, name, and/or tags of the documents. In another example, a primary table may store audio files and/or metadata that describes the length, recording date, and/or file type of the audio files.

The term "metadata," as used herein, generally refers to any data that describes and/or may be derived from a file and/or folder. In some examples, metadata may be included in a header of a file. For example, metadata may include file properties such as a file name, file size, file type, a timestamp of when a file was created, a timestamp of when a file was last modified, and/or tags used to classify the file. In some examples, metadata may be derived by analyzing a file. For example, metadata may include a collection of keywords found in a file. In another example, metadata may include the first paragraph of a document file, the contents of all text formatted as headers within a document file, the total word count of a document file, the language in which a document file is written, and/or a summary of the text in a document file. In some examples, metadata may include a history of the file, such as a list of senders and/or recipients of a file, a list of timestamps of when a file was modified, and/or a list of computing devices that have previously stored a file.

The phrase "intermediate mapping table," as used herein, generally refers to any table that includes both metadata about a file and a pointer to the file. In some embodiments, an intermediate mapping table may sort files into rows based on combinations of metadata describing the files. Additionally or alternatively, an intermediate mapping table may include one or more columns that include specific pieces of metadata and/or a column that includes a list and/or map of files in each row. In some examples, an intermediate mapping table may also include an aggregation of data and/or metadata.

The term "aggregate table," as used herein, generally refers to any table that includes aggregations, counts, and/or any other type of summaries of data and/or metadata. For example, an aggregate table may include a list of counts and/or a total size of files that include specific properties.

Maintaining module 104 may maintain the database in any of a variety of ways and/or contexts. For example, maintaining module 104 may process input to add, update, and/or remove data from tables in the database. In some examples, maintaining module 104 may maintain the database by creating, updating, and/or deleting tables, rows, and/or columns in the database. In some embodiments, maintaining module 104 may process user input in a language such as structured query language (SQL).

In some examples, maintaining module 104 may maintain the database by creating the intermediate mapping table based on the primary table. In some embodiments, maintaining module 104 may create the intermediate mapping table based on the primary table during an initial configuration of the database.

At step 304 one or more of the systems described herein may, for each new item of data received during a time period, update the primary table with the new item of data and update at least one row in the intermediate mapping table with metadata from the new item of data. For example, mapping module 106 may, as part of computing device 202 in FIG. 2, for each item of data 214 received during a time period, update primary table 208 with data 214 and update at least one row in intermediate table 210 with metadata 216 from data 214.

Mapping module 106 may update the primary table and/or the intermediate mapping table in a variety of ways. For example, mapping module 106 may update the primary table with new data, determine the relevant properties of the data, and then update the corresponding row in the intermediate mapping table to reflect the new data in the primary table. In some embodiments, mapping module 106 may update the intermediate mapping table immediately after adding data to the primary table.

In some examples, mapping module 106 may update one or more rows in the intermediate mapping table by storing a pointer to the new item of data in the intermediate mapping table. For example, mapping module 106 may store a name of the file and a location of the file. In some embodiments, mapping module 106 may store a map of file pointers and metadata. For example, mapping module 106 may store a map of file pointers and the size of each file in a row of an intermediate mapping table.

In some examples, mapping module 106 may update one or more rows in the intermediate mapping table by identifying the rows to be updated based on a unique combination of properties that is shared by other data to which pointers are stored in the rows in the intermediate mapping table. For example, an intermediate mapping table may include columns for a confidentiality level of files, a size category of files, and a location of files. In this example, a file that is confidential, large, and was generated in London may have a pointer to the file placed into a mapping in a row that includes pointers to all files in a primary table that are confidential, large, and generated in London.

In some examples, systems described herein may retrieve a set of data from the intermediate mapping table that may include a set of pointers to items of data and a set of metadata about the items of data. For example, a user may run a query for how many files include a certain property. In this example, the user may also retrieve a list of pointers to the set of files that include that property from the intermediate table.

At step 306 one or more of the systems described herein may, at the end of the time period, update the aggregate table with an aggregation of the metadata based on the metadata stored in the intermediate table. For example, aggregation module 108 may, as part of computing device 202 in FIG. 2, at the end of the time period, update aggregate table 212 with aggregation 218 of metadata 216 based on metadata 216 stored in intermediate table 210.

The term "aggregation," as used herein, generally refers to any collection, analysis, and/or summary of information. For example, an aggregation may include a count, a total, an average, a median, a mode, and/or a range. In some examples, an aggregation may include a summary of metadata relating to files. For example, an aggregation may include a count of the number of files that include a certain characteristic or combination of characteristics, a total size of all the files that include a certain characteristic, an average length of audio files, and/or a collection of all the keywords used to tag files with certain characteristics. Many other examples of aggregations are also possible.

Aggregation module 108 may update the aggregate table in a variety of ways. For example, aggregation module 108 may update the aggregate table by transforming the intermediate mapping table into the aggregate table.

In some examples, aggregation module 108 may update the aggregate table with the aggregation by updating a count in the aggregate table to reflect the metadata. For example, aggregation module 108 may update the aggregate table with a count of how many files fit into a certain category and/or include certain properties.

In some examples, aggregation module 108 may update the aggregate table by replacing a mapping in the intermediate table with a count of the files in the mapping. FIG. 4 is a block diagram of an exemplary computing system 400 for maintaining aggregate tables in databases. As illustrated in FIG. 4, database 120 may include primary table 208, intermediate table 210, and/or aggregate table 212. Primary table 208 may store document files and may also store a location, tag, and/or size bucket of the files. Intermediate table 210 may sort the files into rows according to size bucket, tag, and/or location. Intermediate table 210 may also store a mapping in each row of file names to file sizes for the files in that row.

Aggregate table 212 may transform the map row in intermediate table 210 into two columns, one with a count of all the files in the map for that row and one with a total size of all the files in the map.

In some examples, systems described herein may include retrieving the aggregation of the metadata from the aggregate table. For example, a user that wishes to know the total number or total size of sensitive files originating in NY that fall into the medium size bucket may query aggregate table 212 and may retrieve faster results than if the user had calculated the totals based on the data in primary table 208.

In one embodiment, systems described herein may include retrieving at least one data mapping from the intermediate mapping table based on a search result obtained by retrieving the aggregation of the metadata from the aggregate table and retrieving at least one item of data from the primary table based the data mappings retrieved from the intermediate mapping table. To continue the previous example, the systems described herein may retrieve the results that there are two files of medium size originating in NY that have the sensitive tag and may wish to retrieve a list of the files. In this example, the systems described herein may query the row in intermediate table 210 that corresponds to the row in aggregate table 212 that includes the count of the medium size files originating in NY that have the sensitive tag and may retrieve the results that the two files are Payroll.xls and Job_application.pdf.

Figure 5:
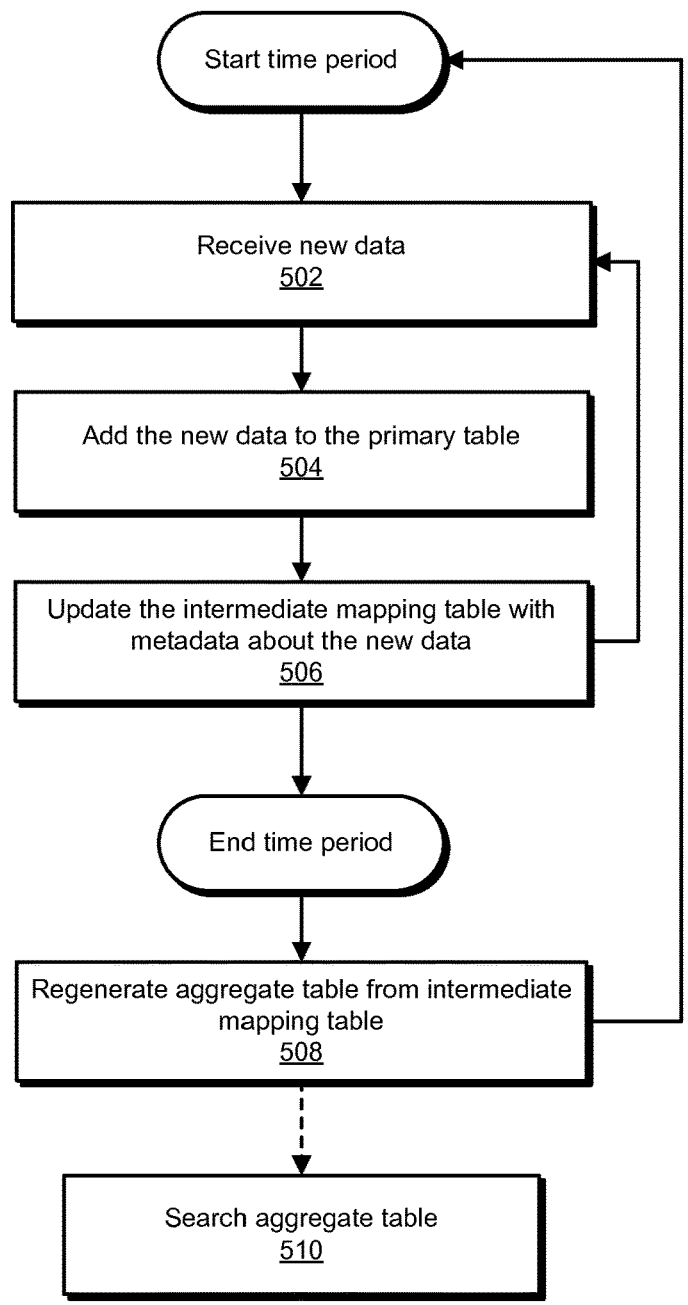
FIG. 5 is a flow diagram of an exemplary method for maintaining aggregate tables in databases.

In one embodiment, the time period may be one of a set of predefined time periods, and at the end of each predefined time period within the set of predefined time periods the aggregate table may be regenerated based on metadata added to the intermediate mapping table that describes data added to the primary table during the predefined time period. FIG. 5 is a block diagram of an exemplary computing system 500 for maintaining aggregate tables in databases by updating the aggregate tables at predetermined intervals.

As illustrated in FIG. 5, after the start of the time period, at step 502 the systems described herein may receive new data. For example, the data may include an audio file. At step 504, the systems described herein may add the new data to the primary table. For example, the location of the audio file may be stored in the primary table along with metadata such as the size of the file, the length of the recording, and the date the recording was made. At step 506, the systems described herein may update the intermediate mapping table with metadata about the new data. Continuing the example, the location of the audio file may be put into a map in a row that includes all files recorded in the same month that are below a certain length. After step 506, the time period may end. In some examples, the systems described herein may receive more data before the end of the time period and may return to step 502. Examples of time periods may include, without limitation, thirty minutes, an hour, a day, several days, and/or a week.

After the end of the time period, at step 508, the systems described herein may regenerate the aggregate table from the intermediate mapping table. For example, rather than incrementing a count of audio files below a certain length recorded in a certain month the systems described herein may count the number of files in the map stored in the intermediate mapping table and update the aggregate table with the new total. A new time period may then start and the systems described herein may return to step 502. In some examples, at step 510 the systems described herein may search the aggregate table. For example, a user may query the table to determine how many audio files below a certain length were recorded in a certain month.

In some examples, aggregation module 108 may update the aggregate table based on the metadata stored in the intermediate table by regenerating the aggregate table entirely based on the intermediate table. In some embodiments, aggregation module 108 may transform the intermediate table into the aggregate table. In some embodiments, aggregation module 108 may update every cell in the aggregate table based on the intermediate table. Additionally or alternatively, aggregation module 108 may delete the aggregate table and recreate the aggregate table based on the intermediate table.

As described in connection with method 300 in FIG. 3 above, the systems described herein may increase the accuracy of searchable aggregation tables by maintaining an intermediate mapping table. When new data is stored in the primary table, the systems described herein may update an intermediate mapping table with any relevant metadata about the new data. At set intervals, the systems described herein may transform the intermediate mapping table into a searchable aggregation table. In some examples, the aggregation table may include counts of the items in the rows of the intermediate mapping table. When a search is run for an aggregation of data in the primary table, the aggregation may be quickly retrieved from the aggregation table. In some examples, a user may work backwards from the aggregation table to retrieve a list of files with desired properties from the intermediate table. By regenerating the aggregation table from the intermediate table, the systems described herein may maintain a quickly searchable aggregation table without risking the inaccuracies that may be caused by simply incrementing counts when new data is added to primary tables.

Figure 6:
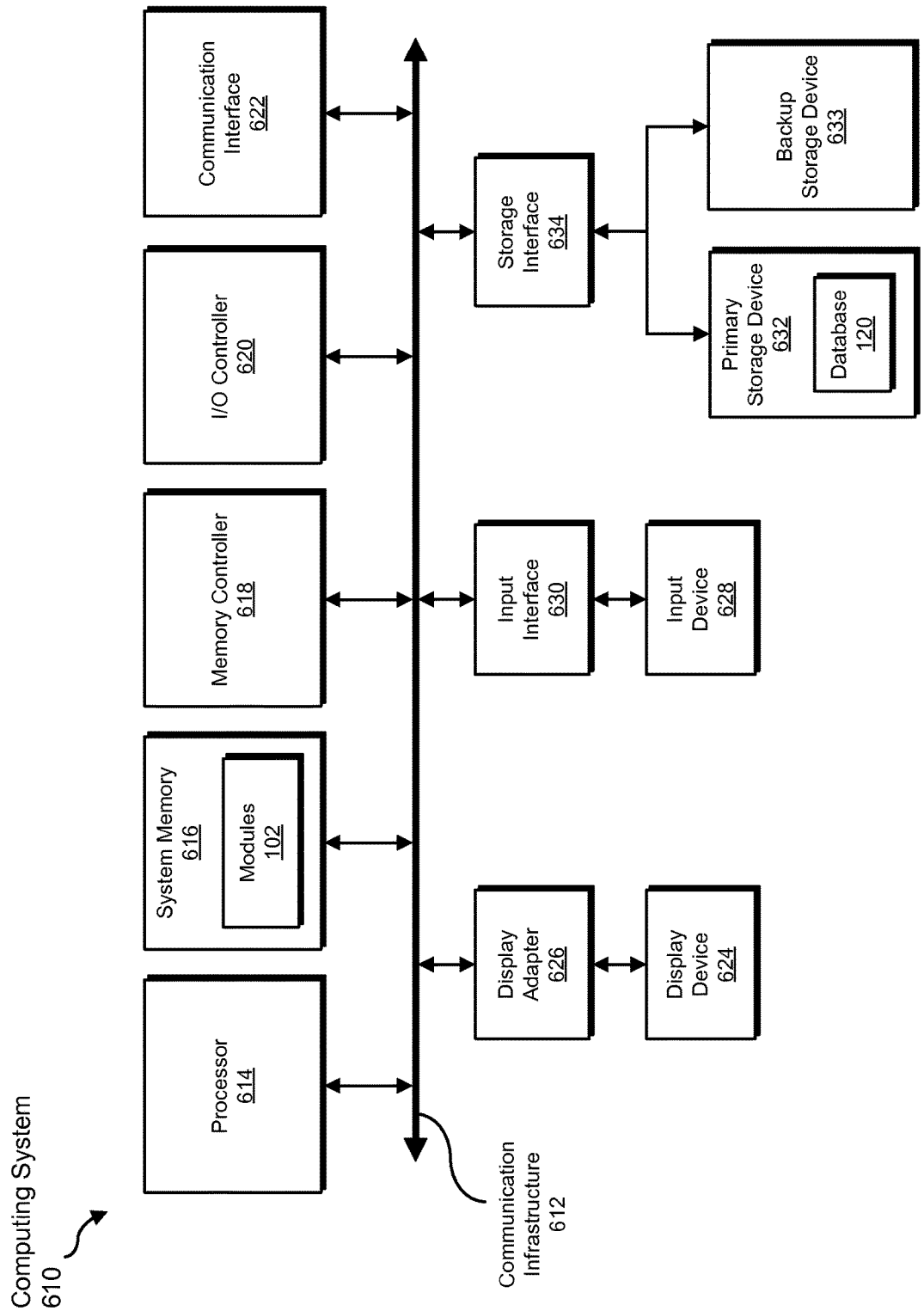
FIG. 6 is a block diagram of an exemplary computing system capable of implementing one or more of the embodiments described and/or illustrated herein.

FIG. 6 is a block diagram of an exemplary computing system 610 capable of implementing one or more of the embodiments described and/or illustrated herein. For example, all or a portion of computing system 610 may perform and/or be a means for performing, either alone or in combination with other elements, one or more of the steps described herein (such as one or more of the steps illustrated in FIG. 3). All or a portion of computing system 610 may also perform and/or be a means for performing any other steps, methods, or processes described and/or illustrated herein.

Computing system 610 broadly represents any single or multi-processor computing device or system capable of executing computer-readable instructions. Examples of computing system 610 include, without limitation, workstations, laptops, client-side terminals, servers, distributed computing systems, handheld devices, or any other computing system or device. In its most basic configuration, computing system 610 may include at least one processor 614 and a system memory 616.

Processor 614 generally represents any type or form of physical processing unit (e.g., a hardware-implemented central processing unit) capable of processing data or interpreting and executing instructions. In certain embodiments, processor 614 may receive instructions from a software application or module. These instructions may cause processor 614 to perform the functions of one or more of the exemplary embodiments described and/or illustrated herein.

System memory 616 generally represents any type or form of volatile or non-volatile storage device or medium capable of storing data and/or other computer-readable instructions. Examples of system memory 616 include, without limitation, Random Access Memory (RAM), Read Only Memory (ROM), flash memory, or any other suitable memory device. Although not required, in certain embodiments computing system 610 may include both a volatile memory unit (such as, for example, system memory 616) and a non-volatile storage device (such as, for example, primary storage device 632, as described in detail below). In one example, one or more of modules 102 from FIG. 1 may be loaded into system memory 616.

In certain embodiments, exemplary computing system 610 may also include one or more components or elements in addition to processor 614 and system memory 616. For example, as illustrated in FIG. 6, computing system 610 may include a memory controller 618, an Input/Output (I/O) controller 620, and a communication interface 622, each of which may be interconnected via a communication infrastructure 612. Communication infrastructure 612 generally represents any type or form of infrastructure capable of facilitating communication between one or more components of a computing device. Examples of communication infrastructure 612 include, without limitation, a communication bus (such as an Industry Standard Architecture (ISA), Peripheral Component Interconnect (PCI), PCI Express (PCIe), or similar bus) and a network.

Memory controller 618 generally represents any type or form of device capable of handling memory or data or controlling communication between one or more components of computing system 610. For example, in certain embodiments memory controller 618 may control communication between processor 614, system memory 616, and I/O controller 620 via communication infrastructure 612.

I/O controller 620 generally represents any type or form of module capable of coordinating and/or controlling the input and output functions of a computing device. For example, in certain embodiments I/O controller 620 may control or facilitate transfer of data between one or more elements of computing system 610, such as processor 614, system memory 616, communication interface 622, display adapter 626, input interface 630, and storage interface 634.

Communication interface 622 broadly represents any type or form of communication device or adapter capable of facilitating communication between exemplary computing system 610 and one or more additional devices. For example, in certain embodiments communication interface 622 may facilitate communication between computing system 610 and a private or public network including additional computing systems. Examples of communication interface 622 include, without limitation, a wired network interface (such as a network interface card), a wireless network interface (such as a wireless network interface card), a modem, and any other suitable interface. In at least one embodiment, communication interface 622 may provide a direct connection to a remote server via a direct link to a network, such as the Internet. Communication interface 622 may also indirectly provide such a connection through, for example, a local area network (such as an Ethernet network), a personal area network, a telephone or cable network, a cellular telephone connection, a satellite data connection, or any other suitable connection.

In certain embodiments, communication interface 622 may also represent a host adapter configured to facilitate communication between computing system 610 and one or more additional network or storage devices via an external bus or communications channel. Examples of host adapters include, without limitation, Small Computer System Interface (SCSI) host adapters, Universal Serial Bus (USB) host adapters, Institute of Electrical and Electronics Engineers (IEEE) 1394 host adapters, Advanced Technology Attachment (ATA), Parallel ATA (PATA), Serial ATA (SATA), and External SATA (eSATA) host adapters, Fibre Channel interface adapters, Ethernet adapters, or the like. Communication interface 622 may also allow computing system 610 to engage in distributed or remote computing. For example, communication interface 622 may receive instructions from a remote device or send instructions to a remote device for execution.

As illustrated in FIG. 6, computing system 610 may also include at least one display device 624 coupled to communication infrastructure 612 via a display adapter 626. Display device 624 generally represents any type or form of device capable of visually displaying information forwarded by display adapter 626. Similarly, display adapter 626 generally represents any type or form of device configured to forward graphics, text, and other data from communication infrastructure 612 (or from a frame buffer, as known in the art) for display on display device 624.

As illustrated in FIG. 6, exemplary computing system 610 may also include at least one input device 628 coupled to communication infrastructure 612 via an input interface 630. Input device 628 generally represents any type or form of input device capable of providing input, either computer or human generated, to exemplary computing system 610. Examples of input device 628 include, without limitation, a keyboard, a pointing device, a speech recognition device, or any other input device.

As illustrated in FIG. 6, exemplary computing system 610 may also include a primary storage device 632 and a backup storage device 633 coupled to communication infrastructure 612 via a storage interface 634. Storage devices 632 and 633 generally represent any type or form of storage device or medium capable of storing data and/or other computer-readable instructions. For example, storage devices 632 and 633 may be a magnetic disk drive (e.g., a so-called hard drive), a solid state drive, a floppy disk drive, a magnetic tape drive, an optical disk drive, a flash drive, or the like. Storage interface 634 generally represents any type or form of interface or device for transferring data between storage devices 632 and 633 and other components of computing system 610. In one example, database 120 from FIG. 1 may be stored in primary storage device 632.

In certain embodiments, storage devices 632 and 633 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 632 and 633 may also include other similar structures or devices for allowing computer software, data, or other computer-readable instructions to be loaded into computing system 610. For example, storage devices 632 and 633 may be configured to read and write software, data, or other computer-readable information. Storage devices 632 and 633 may also be a part of computing system 610 or may be a separate device accessed through other interface systems.

Many other devices or subsystems may be connected to computing system 610. Conversely, all of the components and devices illustrated in FIG. 6 need not be present to practice the embodiments described and/or illustrated herein. The devices and subsystems referenced above may also be interconnected in different ways from that shown in FIG. 6. Computing system 610 may also employ any number of software, firmware, and/or hardware configurations. For example, one or more of the exemplary embodiments disclosed herein may be encoded as a computer program (also referred to as computer software, software applications, computer-readable instructions, or computer control logic) on a computer-readable medium. The term "computer-readable medium," as used herein, generally refers to any form of device, carrier, or medium capable of storing or carrying computer-readable instructions. Examples of computer-readable media include, without limitation, transmission-type media, such as carrier waves, and non-transitory-type media, such as magnetic-storage media (e.g., hard disk drives, tape drives, and floppy disks), optical-storage media (e.g., Compact Disks (CDs), Digital Video Disks (DVDs), and BLU-RAY disks), electronic-storage media (e.g., solid-state drives and flash media), and other distribution systems.

The computer-readable medium containing the computer program may be loaded into computing system 610. All or a portion of the computer program stored on the computer-readable medium may then be stored in system memory 616 and/or various portions of storage devices 632 and 633. When executed by processor 614, a computer program loaded into computing system 610 may cause processor 614 to perform and/or be a means for performing the functions of one or more of the exemplary embodiments described and/or illustrated herein. Additionally or alternatively, one or more of the exemplary embodiments described and/or illustrated herein may be implemented in firmware and/or hardware. For example, computing system 610 may be configured as an Application Specific Integrated Circuit (ASIC) adapted to implement one or more of the exemplary embodiments disclosed herein.

Figure 7:
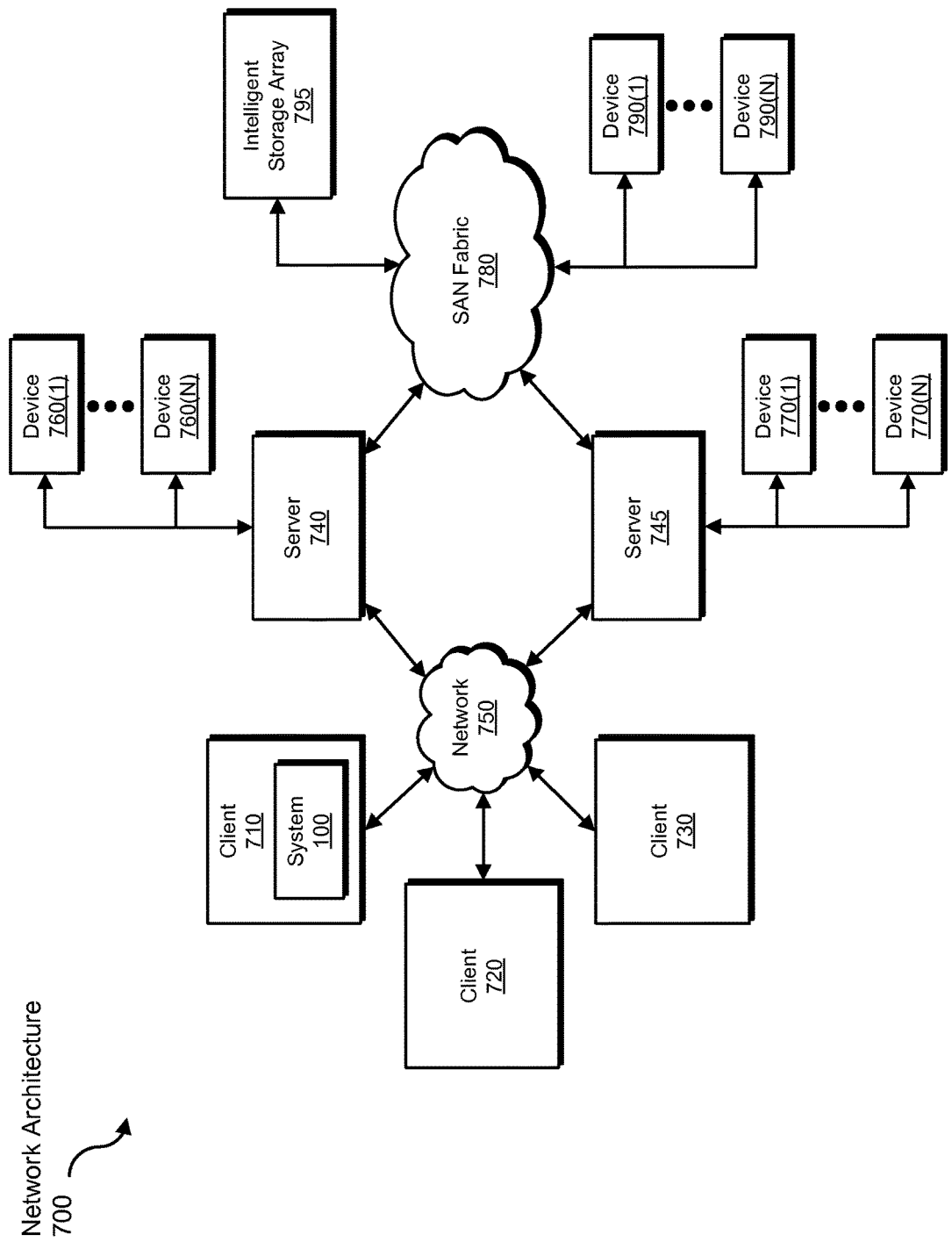
FIG. 7 is a block diagram of an exemplary computing network capable of implementing one or more of the embodiments described and/or illustrated herein.

FIG. 7 is a block diagram of an exemplary network architecture 700 in which client systems 710, 720, and 730 and servers 740 and 745 may be coupled to a network 750. As detailed above, all or a portion of network architecture 700 may perform and/or be a means for performing, either alone or in combination with other elements, one or more of the steps disclosed herein (such as one or more of the steps illustrated in FIG. 3). All or a portion of network architecture 700 may also be used to perform and/or be a means for performing other steps and features set forth in the instant disclosure.

Client systems 710, 720, and 730 generally represent any type or form of computing device or system, such as exemplary computing system 610 in FIG. 6. Similarly, servers 740 and 745 generally represent computing devices or systems, such as application servers or database servers, configured to provide various database services and/or run certain software applications. Network 750 generally represents any telecommunication or computer network including, for example, an intranet, a WAN, a LAN, a PAN, or the Internet. In one example, client systems 710, 720, and/or 730 and/or servers 740 and/or 745 may include all or a portion of system 100 from FIG. 1.

As illustrated in FIG. 7, one or more storage devices 760(1)-(N) may be directly attached to server 740. Similarly, one or more storage devices 770(1)-(N) may be directly attached to server 745. Storage devices 760(1)-(N) and storage devices 770(1)-(N) generally represent any type or form of storage device or medium capable of storing data and/or other computer-readable instructions. In certain embodiments, storage devices 760(1)-(N) and storage devices 770(1)-(N) may represent Network-Attached Storage (NAS) devices configured to communicate with servers 740 and 745 using various protocols, such as Network File System (NFS), Server Message Block (SMB), or Common Internet File System (CIFS).

Servers 740 and 745 may also be connected to a Storage Area Network (SAN) fabric 780. SAN fabric 780 generally represents any type or form of computer network or architecture capable of facilitating communication between a plurality of storage devices. SAN fabric 780 may facilitate communication between servers 740 and 745 and a plurality of storage devices 790(1)-(N) and/or an intelligent storage array 795. SAN fabric 780 may also facilitate, via network 750 and servers 740 and 745, communication between client systems 710, 720, and 730 and storage devices 790(1)-(N) and/or intelligent storage array 795 in such a manner that devices 790(1)-(N) and array 795 appear as locally attached devices to client systems 710, 720, and 730. As with storage devices 760(1)-(N) and storage devices 770(1)-(N), storage devices 790(1)-(N) and intelligent storage array 795 generally represent any type or form of storage device or medium capable of storing data and/or other computer-readable instructions.

In certain embodiments, and with reference to exemplary computing system 610 of FIG. 6, a communication interface, such as communication interface 622 in FIG. 6, may be used to provide connectivity between each client system 710, 720, and 730 and network 750. Client systems 710, 720, and 730 may be able to access information on server 740 or 745 using, for example, a web browser or other client software. Such software may allow client systems 710, 720, and 730 to access data hosted by server 740, server 745, storage devices 760(1)-(N), storage devices 770(1)-(N), storage devices 790(1)-(N), or intelligent storage array 795. Although FIG. 7 depicts the use of a network (such as the Internet) for exchanging data, the embodiments described and/or illustrated herein are not limited to the Internet or any particular network-based environment.

In at least one embodiment, all or a portion of one or more of the exemplary embodiments disclosed herein may be encoded as a computer program and loaded onto and executed by server 740, server 745, storage devices 760(1)-(N), storage devices 770(1)-(N), storage devices 790(1)-(N), intelligent storage array 795, or any combination thereof. All or a portion of one or more of the exemplary embodiments disclosed herein may also be encoded as a computer program, stored in server 740, run by server 745, and distributed to client systems 710, 720, and 730 over network 750.

As detailed above, computing system 610 and/or one or more components of network architecture 700 may perform and/or be a means for performing, either alone or in combination with other elements, one or more steps of an exemplary method for maintaining aggregate tables in databases.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered exemplary in nature since many other architectures can be implemented to achieve the same functionality.

In some examples, all or a portion of exemplary system 100 in FIG. 1 may represent portions of a cloud-computing or network-based environment. Cloud-computing environments may provide various services and applications via the Internet. These cloud-based services (e.g., software as a service, platform as a service, infrastructure as a service, etc.) may be accessible through a web browser or other remote interface. Various functions described herein may be provided through a remote desktop environment or any other cloud-based computing environment.

In various embodiments, all or a portion of exemplary system 100 in FIG. 1 may facilitate multi-tenancy within a cloud-based computing environment. In other words, the software modules described herein may configure a computing system (e.g., a server) to facilitate multi-tenancy for one or more of the functions described herein. For example, one or more of the software modules described herein may program a server to enable two or more clients (e.g., customers) to share an application that is running on the server. A server programmed in this manner may share an application, operating system, processing system, and/or storage system among multiple customers (i.e., tenants). One or more of the modules described herein may also partition data and/or configuration information of a multi-tenant application for each customer such that one customer cannot access data and/or configuration information of another customer.

According to various embodiments, all or a portion of exemplary system 100 in FIG. 1 may be implemented within a virtual environment. For example, the modules and/or data described herein may reside and/or execute within a virtual machine. As used herein, the term "virtual machine" generally refers to any operating system environment that is abstracted from computing hardware by a virtual machine manager (e.g., a hypervisor). Additionally or alternatively, the modules and/or data described herein may reside and/or execute within a virtualization layer. As used herein, the term "virtualization layer" generally refers to any data layer and/or application layer that overlays and/or is abstracted from an operating system environment. A virtualization layer may be managed by a software virtualization solution (e.g., a file system filter) that presents the virtualization layer as though it were part of an underlying base operating system. For example, a software virtualization solution may redirect calls that are initially directed to locations within a base file system and/or registry to locations within a virtualization layer.

In some examples, all or a portion of exemplary system 100 in FIG. 1 may represent portions of a mobile computing environment. Mobile computing environments may be implemented by a wide range of mobile computing devices, including mobile phones, tablet computers, e-book readers, personal digital assistants, wearable computing devices (e.g., computing devices with a head-mounted display, smartwatches, etc.), and the like. In some examples, mobile computing environments may have one or more distinct features, including, for example, reliance on battery power, presenting only one foreground application at any given time, remote management features, touchscreen features, location and movement data (e.g., provided by Global Positioning Systems, gyroscopes, accelerometers, etc.), restricted platforms that restrict modifications to system-level configurations and/or that limit the ability of third-party software to inspect the behavior of other applications, controls to restrict the installation of applications (e.g., to only originate from approved application stores), etc. Various functions described herein may be provided for a mobile computing environment and/or may interact with a mobile computing environment.

In addition, all or a portion of exemplary system 100 in FIG. 1 may represent portions of, interact with, consume data produced by, and/or produce data consumed by one or more systems for information management. As used herein, the term "information management" may refer to the protection, organization, and/or storage of data. Examples of systems for information management may include, without limitation, storage systems, backup systems, archival systems, replication systems, high availability systems, data search systems, virtualization systems, and the like.

In some embodiments, all or a portion of exemplary system 100 in FIG. 1 may represent portions of, produce data protected by, and/or communicate with one or more systems for information security. As used herein, the term "information security" may refer to the control of access to protected data. Examples of systems for information security may include, without limitation, systems providing managed security services, data loss prevention systems, identity authentication systems, access control systems, encryption systems, policy compliance systems, intrusion detection and prevention systems, electronic discovery systems, and the like.

According to some examples, all or a portion of exemplary system 100 in FIG. 1 may represent portions of, communicate with, and/or receive protection from one or more systems for endpoint security. As used herein, the term "endpoint security" may refer to the protection of endpoint systems from unauthorized and/or illegitimate use, access, and/or control. Examples of systems for endpoint protection may include, without limitation, anti-malware systems, user authentication systems, encryption systems, privacy systems, spam-filtering services, and the like.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

While various embodiments have been described and/or illustrated herein in the context of fully functional computing systems, one or more of these exemplary embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the exemplary embodiments disclosed herein.

In addition, one or more of the modules described herein may transform data, physical devices, and/or representations of physical devices from one form to another. For example, one or more of the modules recited herein may receive data to be transformed, transform the data, output a result of the transformation to an intermediate table, use the result of the transformation to aggregate metadata, and store the result of the transformation to an aggregation table. Additionally or alternatively, one or more of the modules recited herein may transform a processor, volatile memory, non-volatile memory, and/or any other portion of a physical computing device from one form to another by executing on the computing device, storing data on the computing device, and/or otherwise interacting with the computing device.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. A computer-implemented method for maintaining aggregate tables in databases, at least a portion of the method being performed by a computing device comprising at least one processor, the method comprising:
    maintaining a database that comprises a primary table of data, an intermediate mapping table of metadata from the data in the primary table, and an aggregate table that aggregates the metadata from the intermediate mapping table, wherein at least the intermediate mapping table comprises a physical implementation of a denormalized contiguous linked list;
    for each new item of data received during a time period:
        updating the primary table with the new item of data;
        identifying a row in the intermediate mapping table that specifies column values and determining that the new item of data matches the specified column values; and
        updating the row in the intermediate mapping table with a pointer to the new item of data within the primary table of data immediately after updating the primary table with the new item of data, such that the row in the intermediate mapping table represents an aggregation of all rows within the primary table of data that match the specified column values and the row in the intermediate mapping table includes separate pointers to each row within the primary table of data that matches the specified column values;
    at the end of the time period, updating the aggregate table with an aggregation of the metadata based on the metadata stored in the intermediate table rather than directly updating a count in the aggregate table to reflect each new item of data, to increase accuracy of the aggregate table;
    retrieving at least one data mapping from the intermediate mapping table based on a search result obtained by retrieving the aggregation of the metadata from the aggregate table; and
    retrieving at least one item of data from the primary table based on the at least one data mapping retrieved from the intermediate mapping table.

2. The computer-implemented method of claim 1, wherein updating the aggregate table with the aggregation comprises updating the count in the aggregate table to reflect the metadata.

3. The computer-implemented method of claim 1, wherein the time period is one of a plurality of predefined time periods and at the end of each predefined time period within the plurality of predefined time periods the aggregate table is regenerated based on metadata added to the intermediate mapping table that describes data added to the primary table during the predefined time period.

4. The computer-implemented method of claim 1, wherein updating the aggregate table based on the metadata stored in the intermediate table comprises regenerating the aggregate table entirely based on the intermediate table.

5. The computer-implemented method of claim 1, wherein maintaining the database comprises creating the intermediate mapping table based on the primary table.

6. The computer-implemented method of claim 1, wherein updating the at least one row in the intermediate mapping table comprises storing at least one column value of the new item of data in the row in the intermediate mapping table.

7. The computer-implemented method of claim 1, further comprising retrieving a set of data from the intermediate mapping table that comprises a set of pointers to items of data and a set of metadata about the items of data wherein the set of pointers comprises the pointer to the new item of data.

8. The computer-implemented method of claim 1, wherein updating the at least one row in the intermediate mapping table comprises identifying the row to be updated based on a unique combination of properties that is shared by at least one other item of data to which the pointer is stored in the at least one row in the intermediate mapping table.

9. A system for maintaining aggregate tables in databases, the system comprising:
  a maintaining module, stored in memory, that maintains a database that by a primary table of data, an intermediate mapping table of metadata from the data in the primary table, and an aggregate table that aggregates the metadata from the intermediate mapping table, wherein at least the intermediate mapping table comprises a physical implementation of a denormalized contiguous linked list;
  a mapping module, stored in memory, that, for each new item of data received during a time period:
    updates the primary table with the new item of data;
    identifies a row in the intermediate mapping table that specifies column values and determines that the new item of data matches the specified column values; and
    updates the row in the intermediate mapping table with a pointer to the new item of data within the primary table of data immediately after the primary table is updated with the new item of data, such that the row in the intermediate mapping table represents an aggregation of all rows within the primary table of data that match the specified column values and the row in the intermediate mapping table includes separate pointers to each row within the primary table of data that matches the specified column values;
  an aggregation module, stored in memory, that at the end of the time period, updates the aggregate table with an aggregation of the metadata based on the metadata stored in the intermediate table rather than directly updating a count in the aggregate table to reflect each new item of data to increase accuracy of the aggregate table;
  a retrieving module, stored in memory, that retrieves at least one data mapping from the intermediate mapping table based on a search result obtained by retrieving the aggregation of the metadata from the aggregate table, and the retrieving module retrieves at least one item of data from the primary table based on the at least one data mapping retrieved from the intermediate mapping table; and
  at least one physical processor configured to execute the maintaining module, the mapping module, and the aggregation module.

10. The system of claim 9, wherein the aggregation module updates the aggregate table with the aggregation by updating the count in the aggregate table to reflect the metadata.

11. The system of claim 9, wherein the time period is one of a plurality of predefined time periods and at the end of each predefined time period within the plurality of predefined time periods the aggregation module regenerates the aggregate table based on metadata added to the intermediate mapping table that describes data added to the primary table during the predefined time period.

12. The system of claim 9, wherein the aggregation module updates the aggregate table based on the metadata stored in the intermediate table by regenerating the aggregate table entirely based on the intermediate table.

13. The system of claim 9, wherein the maintaining module maintains the database by creating the intermediate mapping table based on the primary table.

14. The system of claim 9, wherein the mapping module updates the at least one row in the intermediate mapping table by storing at least one column value of the new item of data in the row in the intermediate mapping table.

15. A non-transitory computer-readable medium comprising one or more computer-readable instructions that, when executed by at least one processor of a computing device, cause the computing device to:
  maintain a database that comprises a primary table of data, an intermediate mapping table of metadata from the data in the primary table, and an aggregate table that aggregates the metadata from the intermediate mapping table, wherein at least the intermediate mapping table comprises a physical implementation of a denormalized contiguous linked list;
  for each new item of data received during a time period:
    update the primary table with the new item of data;
    identify a row in the intermediate mapping table that specifies column values and determine that the new item of data matches the specified column values; and
    update the row in the intermediate mapping table with a pointer to the new item of data within the primary table of data immediately after the primary table is updated with the new item of data, such that the row in the intermediate mapping table represents an aggregation of all rows within the primary table of data that match the specified column values and the row in the intermediate mapping table includes separate pointers to each row within the primary table of data that matches the specified column values;
  at the end of the time period, update the aggregate table with an aggregation of the metadata based on the metadata stored in the intermediate table rather than directly updating a count in the aggregate table to reflect each new item of data, to increase accuracy of the aggregate table;
  retrieve at least one data mapping from the intermediate mapping table based on a search result obtained by retrieving the aggregation of the metadata from the aggregate table; and
  retrieve at least one item of data from the primary table based on the at least one data mapping retrieved from the intermediate mapping table.

16. The method of claim 1, wherein the primary table comprises a linked list of pointers to files.

17. The method of claim 1, wherein the denormalized contiguous linked list of the intermediate mapping table comprises a list of item names linked by commas.

18. The method of claim 1, wherein the denormalized contiguous linked list of the intermediate mapping table comprises pointers to files.

19. The system of claim 9, wherein the maintaining module is configured to create the intermediate mapping table based on the data in the primary table.

20. The system of claim 9, wherein the mapping module identifies a row in the intermediate mapping table by identifying the rows based on a unique combination of properties that is shared by other data to which pointers are stored in the rows in the intermediate mapping table.

* * * * *